(12) United States Patent
Graber

(10) Patent No.: US 9,623,786 B1
(45) Date of Patent: Apr. 18, 2017

(54) RECREATIONAL VEHICLE WITH SLIDE OUT ROOM

(71) Applicant: Highland Ridge RV, Inc., Middlebury, IN (US)

(72) Inventor: Randall L. Graber, Elkhart, IN (US)

(73) Assignee: HIGHLAND RIDGE RV, INC., Middlebury, IN (US)

( * ) Notice: Subject to any disclaimer, the term of this patent is extended or adjusted under 35 U.S.C. 154(b) by 0 days.

(21) Appl. No.: 14/950,068

(22) Filed: Nov. 24, 2015

Related U.S. Application Data

(60) Provisional application No. 62/083,543, filed on Nov. 24, 2014.

(51) Int. Cl.
 *B60P 3/34* (2006.01)
(52) U.S. Cl.
 CPC ..................................... *B60P 3/34* (2013.01)
(58) Field of Classification Search
 CPC .................. B60P 3/32; B60P 3/34; B60P 3/39
 USPC ................... 296/26.12, 26.13, 165, 171, 175
 See application file for complete search history.

(56) References Cited

U.S. PATENT DOCUMENTS

| | | | |
|---|---|---|---|
| 2,813,747 A | 11/1957 | Rice, Jr. | |
| RE32,262 E | 10/1986 | Stewart | |
| 5,620,224 A | 4/1997 | DiBiagio et al. | |
| 5,658,032 A | 8/1997 | Gardner | |
| 5,706,612 A | 1/1998 | Tillett | |
| 5,732,839 A | 3/1998 | Schimmang et al. | |
| 6,176,045 B1 | 1/2001 | McManus et al. | |
| 6,286,883 B1 | 9/2001 | Schneider et al. | |
| 6,293,611 B1 | 9/2001 | Schneider et al. | |
| 6,637,794 B2 | 10/2003 | McManus et al. | |
| 6,729,669 B2 | 5/2004 | McManus et al. | |
| 6,802,555 B2 * | 10/2004 | Yoder ....................... | B60P 3/34 296/165 |
| 7,178,849 B1 * | 2/2007 | Blodgett, Jr. ............. | B60P 3/34 296/26.12 |

OTHER PUBLICATIONS

Product Photos, Sep. 2013, 3 pages.

* cited by examiner

*Primary Examiner* — Jason S Daniels
(74) *Attorney, Agent, or Firm* — Ryan M. Fountain

(57) ABSTRACT

In one embodiment of the present invention, a recreational vehicle includes a floor having a floor covering, a side wall having an opening therein and a slide out room moveable through the opening in the side wall. The slide out room has a structural member and a floor having a floor covering. First and second moldings provide a transition between the floor of the recreational vehicle and the floor of the slide out room.

1 Claim, 7 Drawing Sheets

RECREATIONAL VEHICLE WITH SLIDE OUT ROOM

The present invention relates to recreational vehicles with slide out rooms and, in particular, to a floor structure for a recreational vehicle with a slide out room.

SUMMARY OF THE INVENTION

In one embodiment of the present invention, a recreational vehicle includes a floor having a floor covering, a side wall having an opening therein and a slide out room moveable through the opening in the side wall. The slide out room has a structural member and a floor having a floor covering. A first molding is secured to the floor of the recreational vehicle, the first molding having a first section sloping upwardly from the floor of the recreational vehicle toward the opening in the side wall, a second section sloping downwardly from the first section, a third section sloping upwardly from the second section, a fourth section sloping downwardly from the third section and a first generally vertical end. The structural member has a lower surface that angles downwardly and away from the fourth section of the first molding. A second molding has a first surface connected to the floor of the recreational vehicle and a second surface sloping upwardly from the floor of the recreational vehicle and toward the first end of the first molding so as to be generally coplanar with the first section of the first molding.

DETAILED DESCRIPTION OF THE EMBODIMENTS OF THE INVENTION

Figure 1:
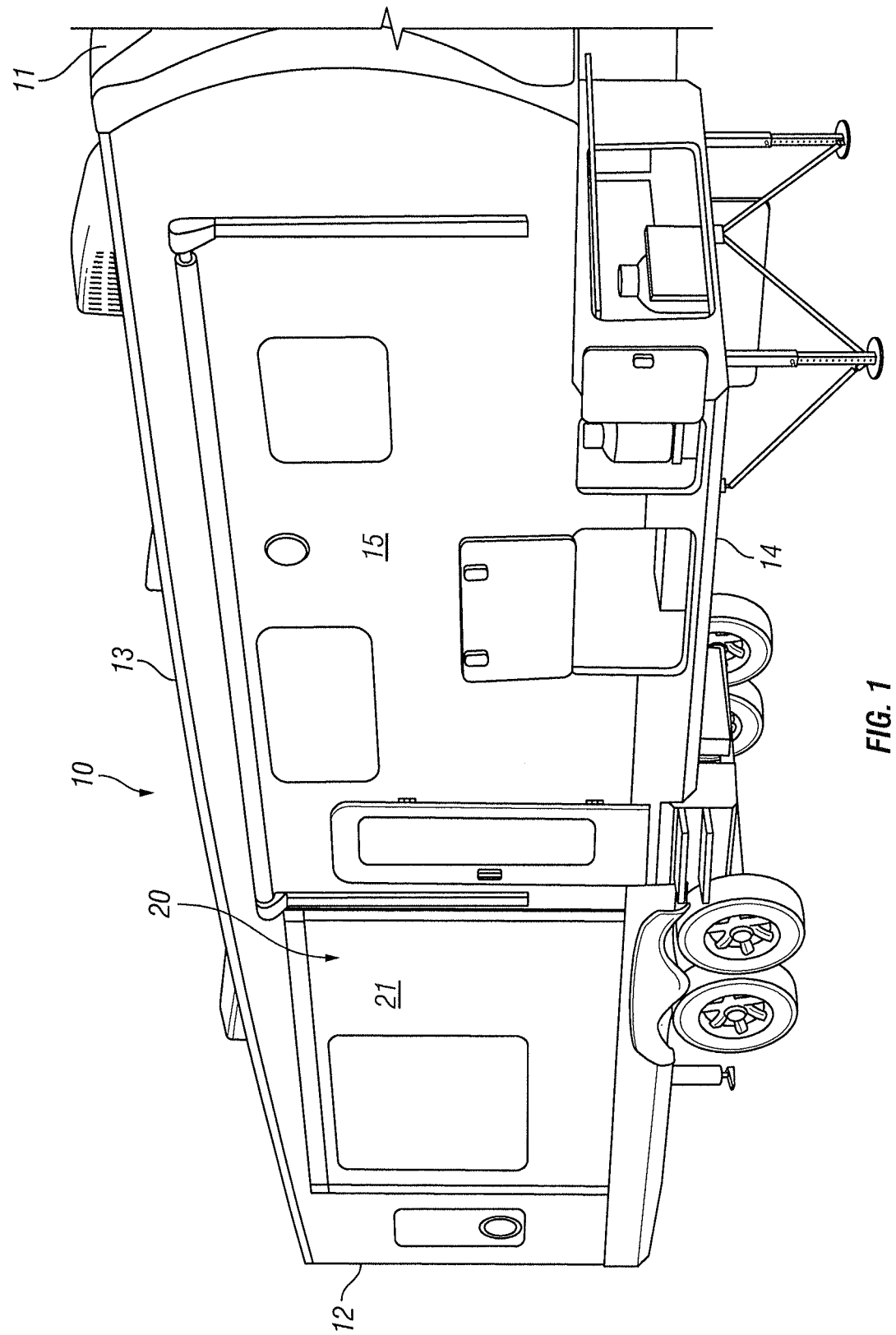
FIG. 1 is a right side perspective view of a recreational vehicle according to one embodiment of the present invention.
Figure 2:
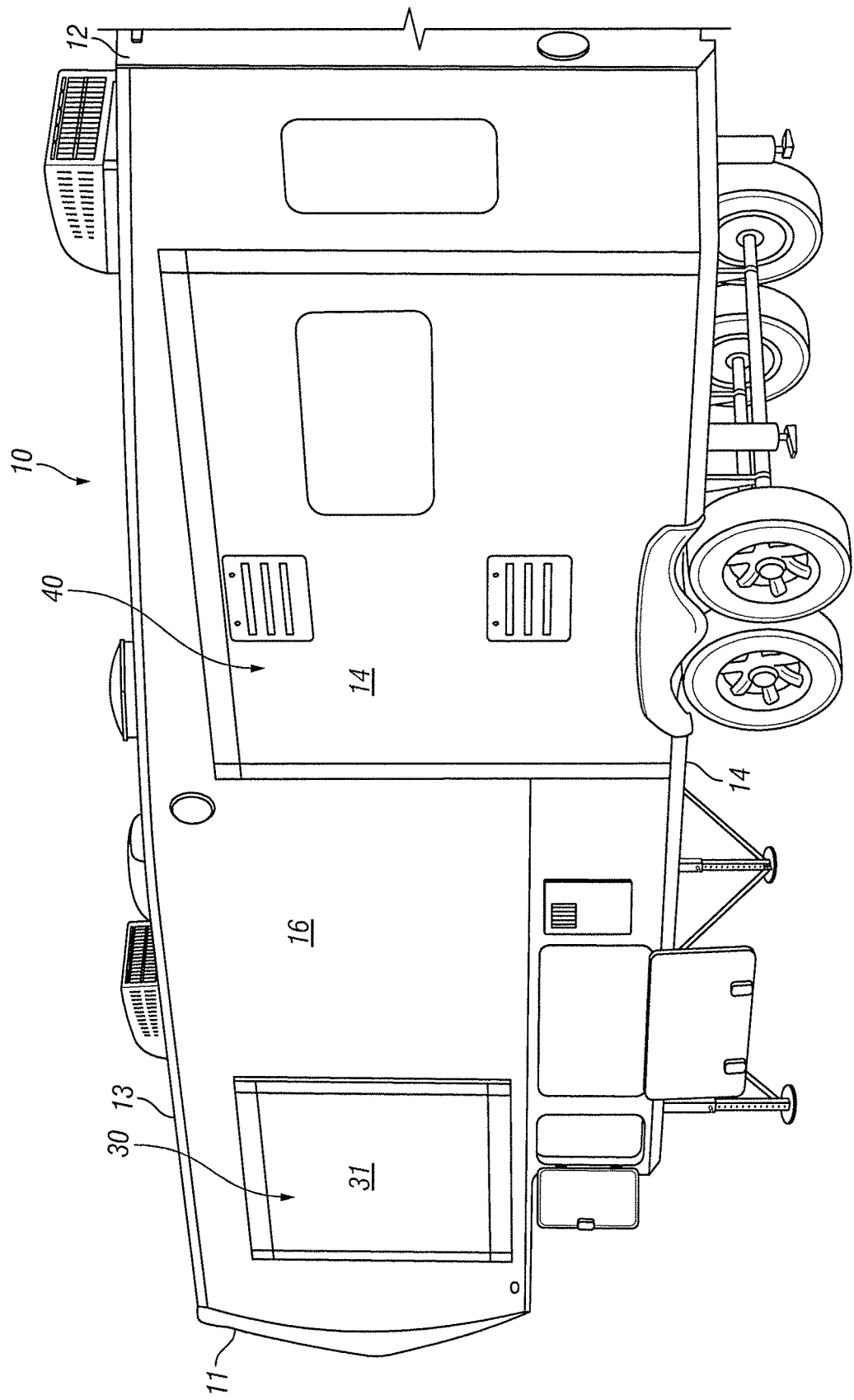
FIG. 2 is a left side perspective view of the recreational vehicle shown in FIG. 1.
Figure 3:
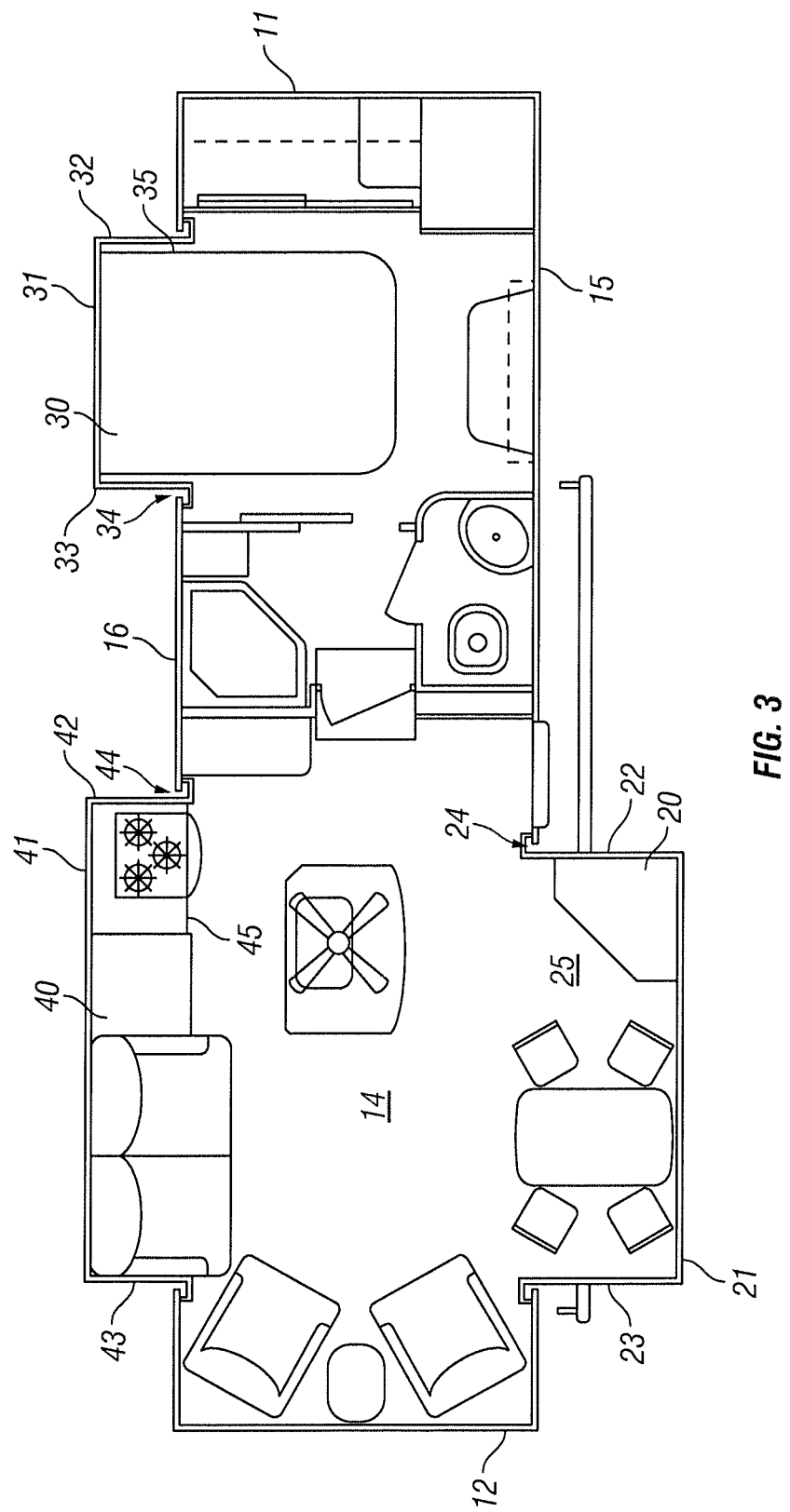
FIG. 3 is a floor plan of the recreational vehicle shown in FIG. 1
Figure 4:
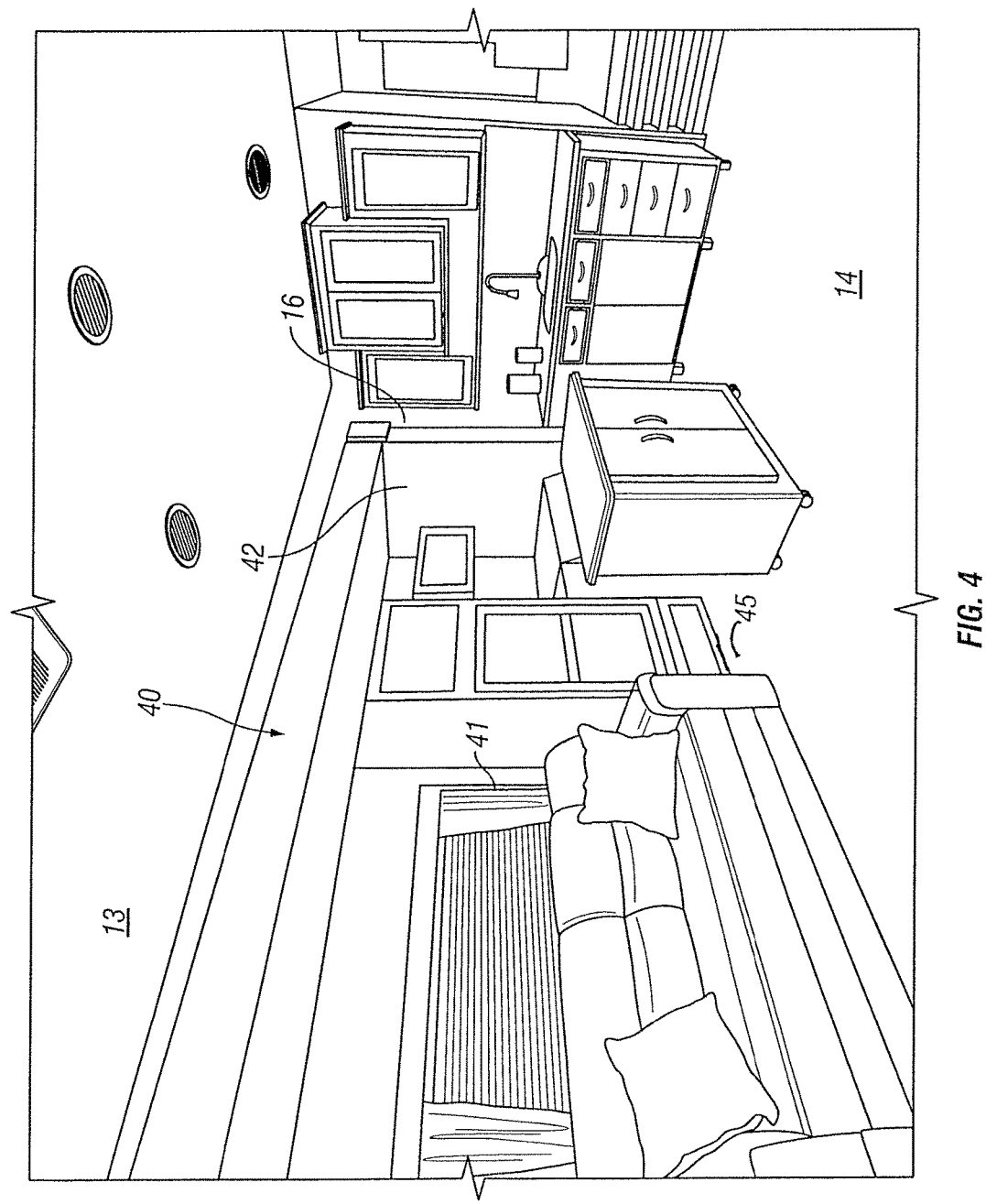
FIG. 4 is an interior perspective view of the recreational vehicle shown in FIG. 1 showing one of the slide out rooms in the extended position.

FIG. 1 is a right side perspective view of a recreational vehicle according to one embodiment of the present invention. Recreational vehicle 10 generally includes a front end 11, a back end 12, a roof 13, a floor 14, a right side 15 and a left side 16. As shown in FIGS. 1-3, recreational vehicle 10 may be provided with a plurality of slide out rooms 20, 30 and 40.

Slide out rooms 20, 30 and 40 each have an outer wall 21, 31, 41, respectively, and side walls 22, 23, 32, 33, 42, 43, respectively. Slide out room 20 may be moved through opening 24 in right side 15 of recreational vehicle 10 and slide out rooms 30 and 40 may be moved through openings 34 and 44 in left side 16 of recreational vehicle 10 so as to move slide out rooms 20, 30 and 40 from the stored position showed in FIGS. 1 and 2 to the extended position shown in FIG. 3. In the stored position, outer walls 21, 31 and 41 are substantially flush with right side 15 and left side 16 of recreational vehicle 10 and side walls 22, 23, 32, 33, 42, 43 are located within the interior of recreational vehicle 10. In the extended position, outer walls 21, 31 and 41 are spaced from right side 15 and left side 16 and side walls 22, 23, 32, 33, 42, 43 extend beyond right side 15 and left side 16 of recreational vehicle 10. Slide out rooms 20, 30 and 40 each include a floor 25, 35, 45, respectively, that is positioned above floor 14 when slide out rooms 20, 30 and 40 are in the stored position of FIGS. 1 and 2 and which slide over floor 14 and extend from openings 24, 34, 44 when slide out rooms 20, 30 and 40 are in the extended position shown in FIG. 3.

Figure 5:
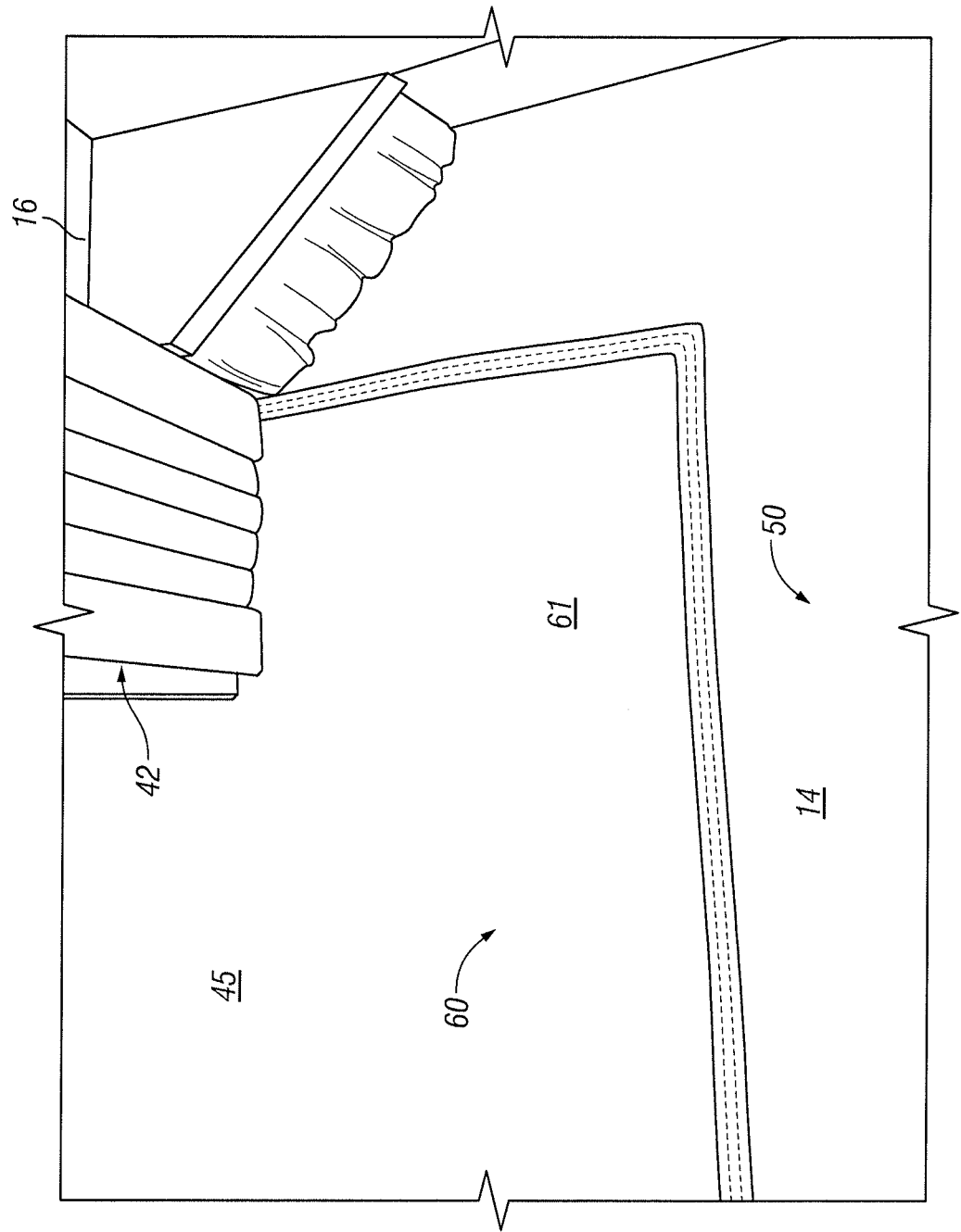
FIG. 5 is a detailed perspective view of a portion of the slide out room and recreational vehicle floor of the recreational vehicle shown in FIG. 1.
Figure 6:
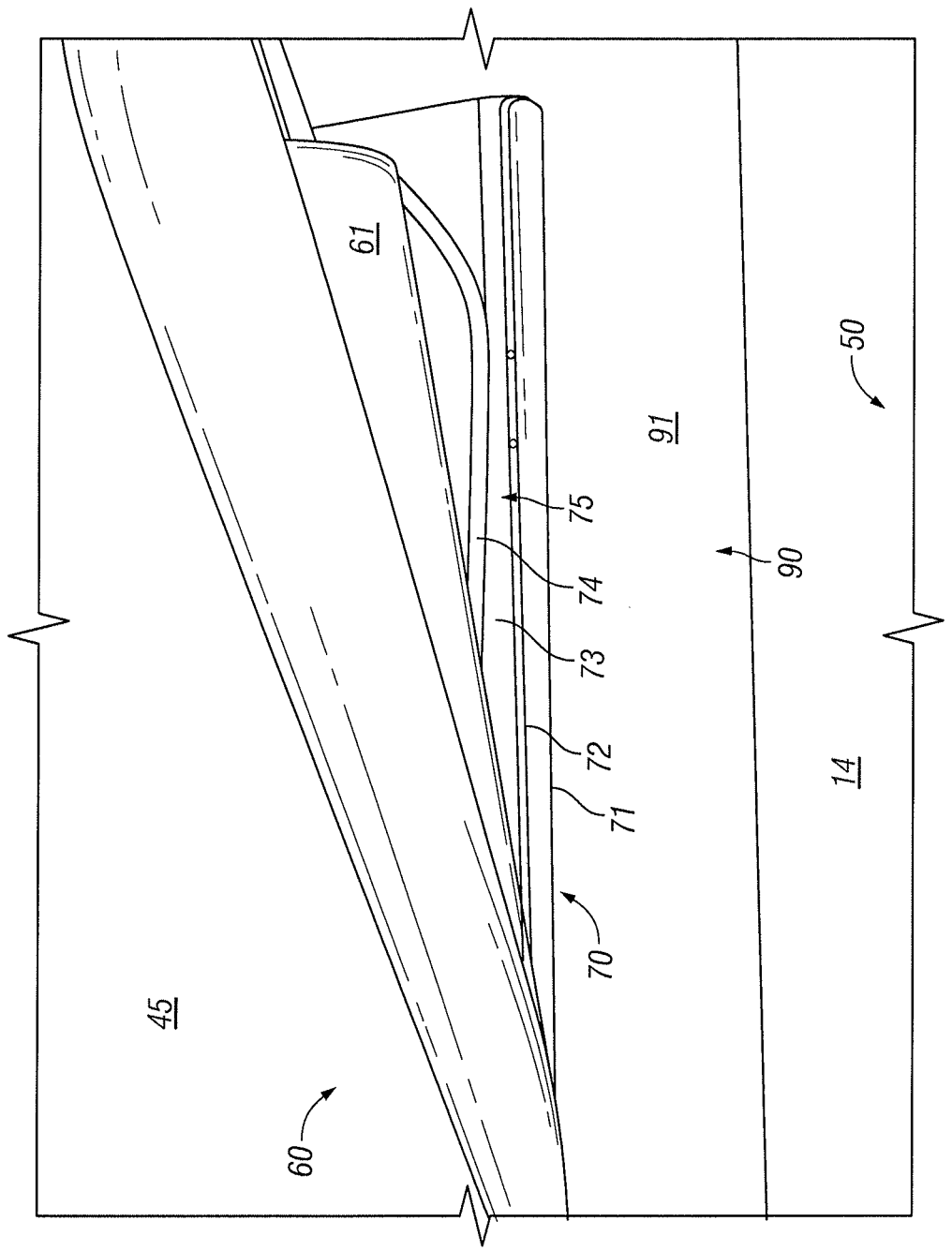
FIG. 6 is a top view of certain components of the floor structure of the slide out room shown in FIG. 4.
Figure 7:
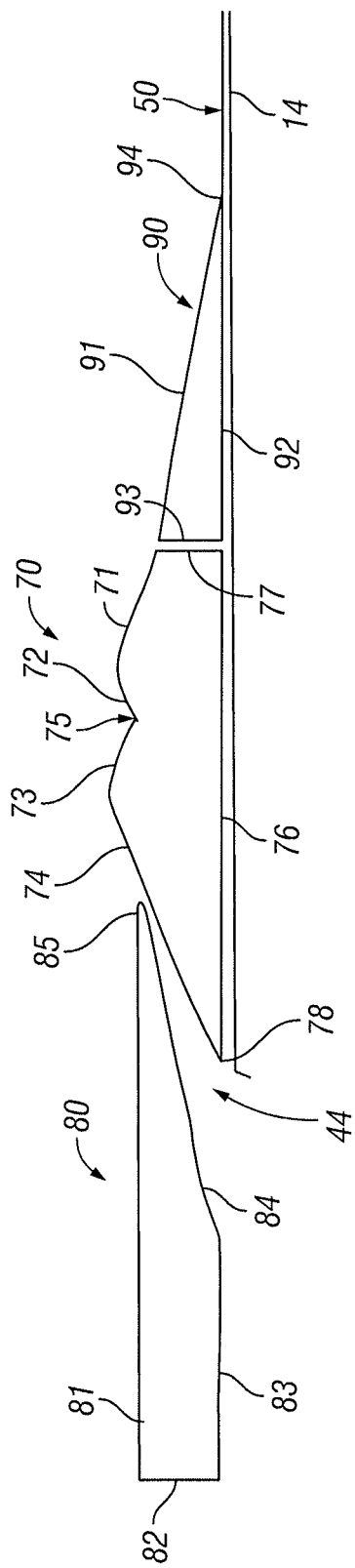
FIG. 7 is an end elevational view of certain components of the floor structure of the slide our room shown in FIG. 4.

Turning to FIGS. 5-7, floor 14 is provided with floor covering 50 and floor 45 of slide out room 40 is provided with floor covering 60. A molding 70 is secured to floor 14 of recreational vehicle 10 adjacent opening 44 in left side 16. In the embodiment shown, molding 70 is secured on floor covering 50. Molding 70 may be secured by adhesive, screws or other means. In the embodiment shown, molding 70 generally includes a first section 71 sloping upwardly, a second section 72 sloping downwardly from first section 71, a third section 73 sloping upwardly from second section 72, a fourth section 74 sloping downwardly from third section 73 toward opening 44 in left side 16 and a lower surface 76. Molding 70 further includes a first end 77 and a second end 78. The juncture of second section 72 and third section 73 forms a valley or recessed are 75 in molding 70.

Floor 45 of slide out room 40 is provided with support member 80 which is located adjacent opening 44 in left side 16 when slide out room 40 is in the extended position. In the embodiment shown, member 80 is a hollow extrusion having an upper surface 81, a rear surface 82, a first lower surface 83 which is generally parallel to upper surface 81 and perpendicular to rear surface 82, and a second lower surface 84 that angles upwardly from first lower surface 83 to upper surface 81 at end 85.

Recreational vehicle 10 further includes a molding 90. In the embodiment shown, molding 90 is a generally triangular or ramp like member having an upper surface 91, a lower surface 92, a first end 93 and a second end 94. Molding 90 is secured to floor 14 of recreational vehicle 10. In the embodiment shown, molding 90 is secured on floor covering 50. Upper surface 91 slopes upwardly from floor covering 50 toward first section 71 of molding 70.

A subflooring structure (not shown) is secured to upper surface 81 of structural member 80 and floor covering 60 of slide out room 40 is secured to the subflooring assembly. Note that the underside of floor covering 60 may be secured directly to the subflooring assembly and molding 90 or there could be intermediate padding or other structure therebetween. A portion of floor covering 60 extends beyond molding 90 so as to form a flap 61.

As slide out room 40 is extended from recreational vehicle 10, lower surfaces 83 and 84 of structural member 80 ride over moldings 90 and 70 until end 85 of member 80 is positioned on or adjacent fourth section 74 of molding 70 as shown in FIG. 7. Slide out room 40 will lower as member 80 clears the juncture of third section 73 and fourth section 74 of molding 70. Member 80, molding 70, molding 90 and the length of flap 61 of floor covering 60 are configured such that there is a substantially flat transition between floor covering 50 on floor 14 and floor covering 60 on floor 45 of slide out room 40 when slide out room 40 is in the extended position.

Although the present invention has been shown and described in detail the same is to be taken by way of example only and not by way of limitation. Numerous changes can be made to the embodiments described without departing from the scope of the invention. For example, molding 70, member 80 and molding 90 can have configurations other than those shown as long as they function with flap 61 of floor covering 60 to provide a flat transition from floor 14 to floor 45. The floor structure can be applied to one or more of slide out rooms 20, 30 or 40. Other modifications are also possible.

I claim:

1. A recreational vehicle including:
   a first floor having a first floor covering;
   a side wall having an opening therein;
   a slide out room moveable through the opening in the side wall, the slide out room having a structural member and a second floor having a second floor covering;
   a first molding secured to the first floor of the recreational vehicle, the first molding having a first section sloping upwardly from the first floor of the recreational vehicle toward the opening in the side wall, a second section sloping downwardly from the first section, a third section sloping upwardly from the second section, a fourth section sloping downwardly from the third section and a first generally vertical end;
   the structural member having a lower surface that angles downwardly and away from the fourth section of the first molding; and
   a second molding having a first surface connected to the first floor of the recreational vehicle and a second surface sloping upwardly from the first floor of the recreational vehicle and toward the first end of the first molding so as to be generally coplanar with the first section of the first molding.

\* \* \* \* \*